UNITED STATES PATENT OFFICE.

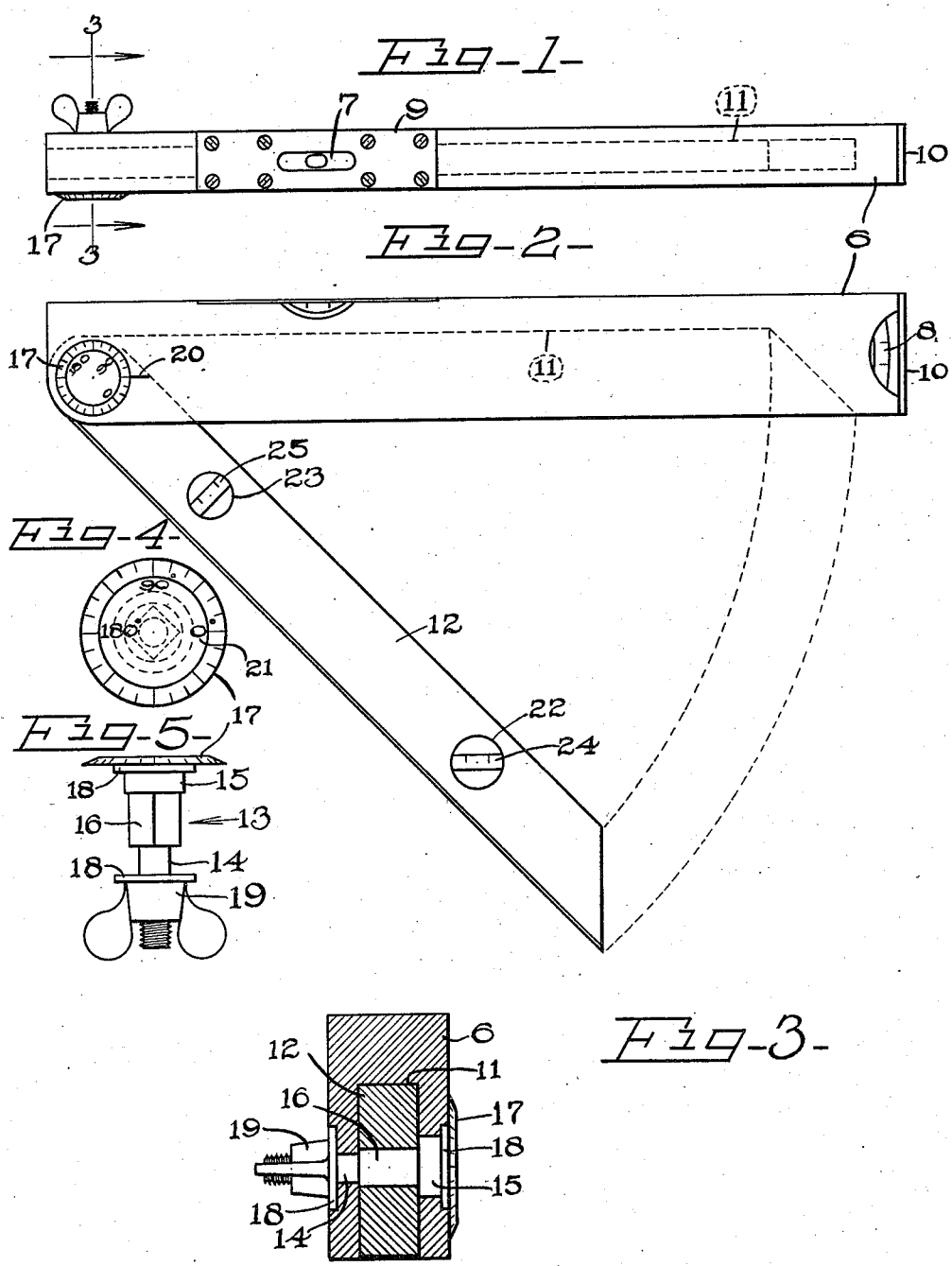

CARL M. L. LARSEN, OF CHICAGO, ILLINOIS.

LEVEL.

1,014,402. Specification of Letters Patent. Patented Jan. 9, 1912.

Application filed June 24, 1911. Serial No. 635,217.

*To all whom it may concern:*

Be it known that I, CARL M. L. LARSEN, a citizen of the United States, and resident of Chicago, in the county of Cook and State of Illinois, have invented a new and useful Improvement in Levels, of which the following is a specification.

The object of my invention is to provide an instrument of the kind entitled a level, which combines the principles and uses of a level, square, try square, plumb and protractor.

The manner in which I accomplish my object is described in the following specification and illustrated in the accompanying drawing in which:—

Figure 1 is a top plan, the parts being in position for use as a level or a plumb. Fig. 2 is a side elevation the parts being in position for use as a try square or protractor. Fig. 3 is a section on the line 3—3, Fig. 1; Fig. 4 is an enlarged face of a dial shown in Figs. 1—2 and 3. Fig. 5 is a bolt and nut of which the dial is an integral part.

In the drawings 6 indicates the body of the device. Set in this body are two spirit tubes 7 and 8. The first of these is for horizontal leveling and the second for a plumb. These tubes are secured in place and protected by the plates 9 and 10. The body 6 is mortised longitudinally on the underside as indicated by the dotted lines 11, in Figs. 1 and 2 and the solid lines 11 in Fig. 3. Insertible in this mortise is an arm 12. This arm is pivotally secured in the body 6 by a bolt 13 which extends transversely through the body 6 and arm 12. This bolt is cylindrical at the parts 14 and 15 which form journals rotatable in the bearing apertures in the body 6, and the part 16 is square and is fitted firmly in the squared aperture in the arm 12 and is thereby adapted to co-act with the movement of the arm 12. The head of this bolt is formed into a dial 17 and marked to indicate 180 degrees of a circle. Slidable on the bolt 13 are two washers 18 which are firmly fixed in the body 6. These washers form friction bearings for the dial 17 and thumb nut 19 by which the arm 12 is firmly clamped in the position desired. On the body 6 is an indent 20 shown in Fig. 2 adapted to correspond with the zero mark 21 on the dial 17 when the device is closed and used for a level. In the arm 12 are two apertures 22 and 23, in which spirit tubes 24 and 25 are secured. These tubes are arranged to register angles of 45 and 90 degrees respectively, when the device is used as a try square or square. Otherwise the divisions of the dial are adapted to be used as a protractor of which the arm 12 and body 6 form the lines of the angle desired. When the arm is opened and placed in line with the body it is adapted to be used with the body as a plumb, one of the spirit tubes in the arm co-acting with the tube at the end of the body, thus doubling the length of the body for vertical use.

What I claim is—

1. A device of the kind described, consisting of a main body provided with spirit tubes whereby said body is adapted for use as a level and plumb, and having a mortise and transverse bore and thereby adapted for the insertion of an arm in said mortise and the pivotal support of said arm in said body; an arm pivotally secured in said mortise in said body, said arm having transverse bores adapted for the insertion of spirit tubes therein, spirit tubes transversely secured in said bores, a screw bolt adapted to extend transversely through said body and said arm and to thereby pivotally secure said arm in said body, said bolt being adapted to be rotated in said body by the movement of said arm, and having a dial which forms the head of said bolt and is rotatable with it, said dial having radial lines adapted to register with a mark on said body whereby said arm and body can be used as a protractor, washers slidable and rotatable on said bolt and sunk in said body, adapted to form bearing surfaces for said dial bolt and a nut, a thumb nut on the threaded part of said bolt, adapted to be rotated on said bolt in contact with one of said washers and to thereby secure said arm, in the position relative to said body, described as shown and described.

2. A device of the kind described consisting of a mortised body portion, a plurality of spirit tubes therein and thereby adapting it for use as a level and plumb, an arm pivotally secured in the mortised part of said body, a plurality of spirit tubes in said arm, whereby said arm and body can be used as a level and plumb, and to test angular surfaces, and pivotal means adapted to secure said arm in said body, said means including a dial whereby said arm and body can be used as a protractor, as described.

CARL M. L. LARSEN.

Witnesses:
  G. T. FRAENCKEL,
  THOMAS J. MORGAN.

Copies of this patent may be obtained for five cents each, by addressing the "Commissioner of Patents, Washington, D. C."